United States Patent [19]

Ford et al.

[11] 4,332,661
[45] Jun. 1, 1982

[54] CELLS HAVING GASKET LUBRICATING MEANS

[75] Inventors: James M. Ford, Cleveland; John O. Adams, Madisonville, both of Tenn.

[73] Assignee: Olin Corporation, New Haven, Conn.

[21] Appl. No.: 222,116

[22] Filed: Jan. 2, 1981

Related U.S. Application Data

[63] Continuation-in-part of Ser. No. 204,127, Nov. 5, 1980.

[51] Int. Cl.³ ...................... C25B 13/02; C25B 13/04; C25B 9/00
[52] U.S. Cl. .................................. 204/253; 204/279; 204/295; 204/296
[58] Field of Search ............................. 204/252–258, 204/263–266, 279, 295–296

[56] References Cited

U.S. PATENT DOCUMENTS

| | | |
|---|---|---|
| 3,378,480 | 4/1968 | Reinshagen et al. ............ 204/279 X |
| 4,013,535 | 3/1977 | White .............................. 204/258 X |
| 4,026,782 | 5/1977 | Bouy et al. ........................... 204/254 |
| 4,138,373 | 2/1979 | Ukihashi et al. ....................... 521/38 |
| 4,175,025 | 11/1979 | Creamer et al. ..................... 204/253 |
| 4,207,165 | 6/1980 | Mose et al. ........................... 204/258 |
| 4,253,932 | 3/1981 | Mose et al. ........................... 204/253 |

FOREIGN PATENT DOCUMENTS 51-126398 11/1976 Japan ..................................... 204/96

Primary Examiner—Delbert E. Gantz
Assistant Examiner—Donald R. Valentine
Attorney, Agent, or Firm—Ralph D'Alessandro; Donald F. Clements; Thomas P. O'Day

[57] ABSTRACT

In an electrolytic cell lubricous material is provided between at least one gasket and the adjacent surface of the membrane between adjacent electrode frames to permit the gasket to deform during assembly and operation of the cell when compressive force is applied to effect fluid-tight seals between the gaskets and the adjacent electrode frames without damaging the membrane.

17 Claims, 5 Drawing Figures

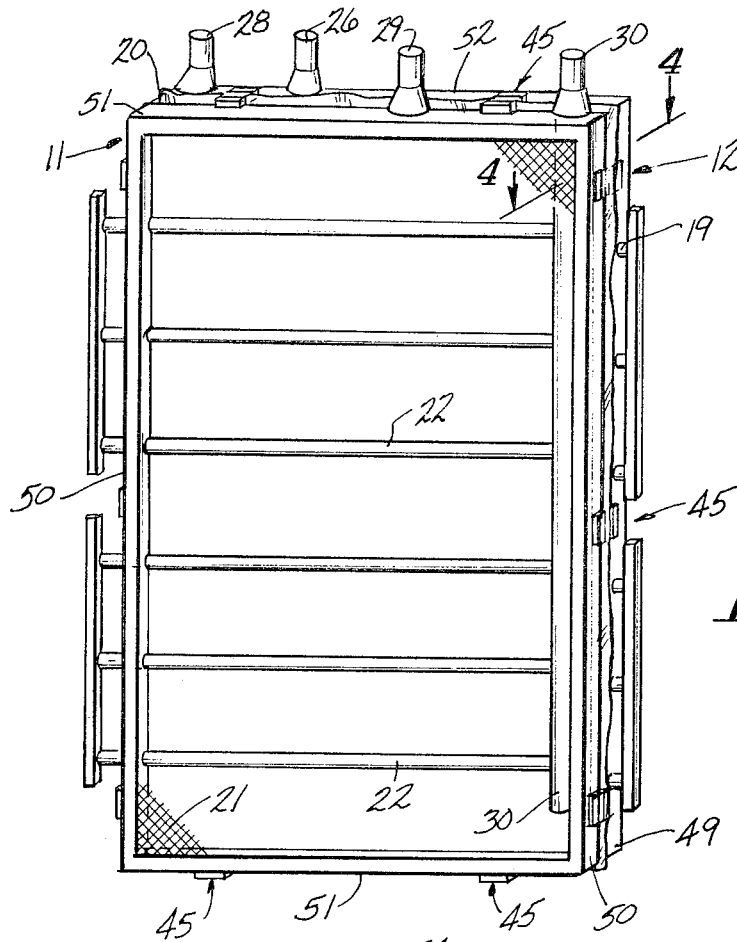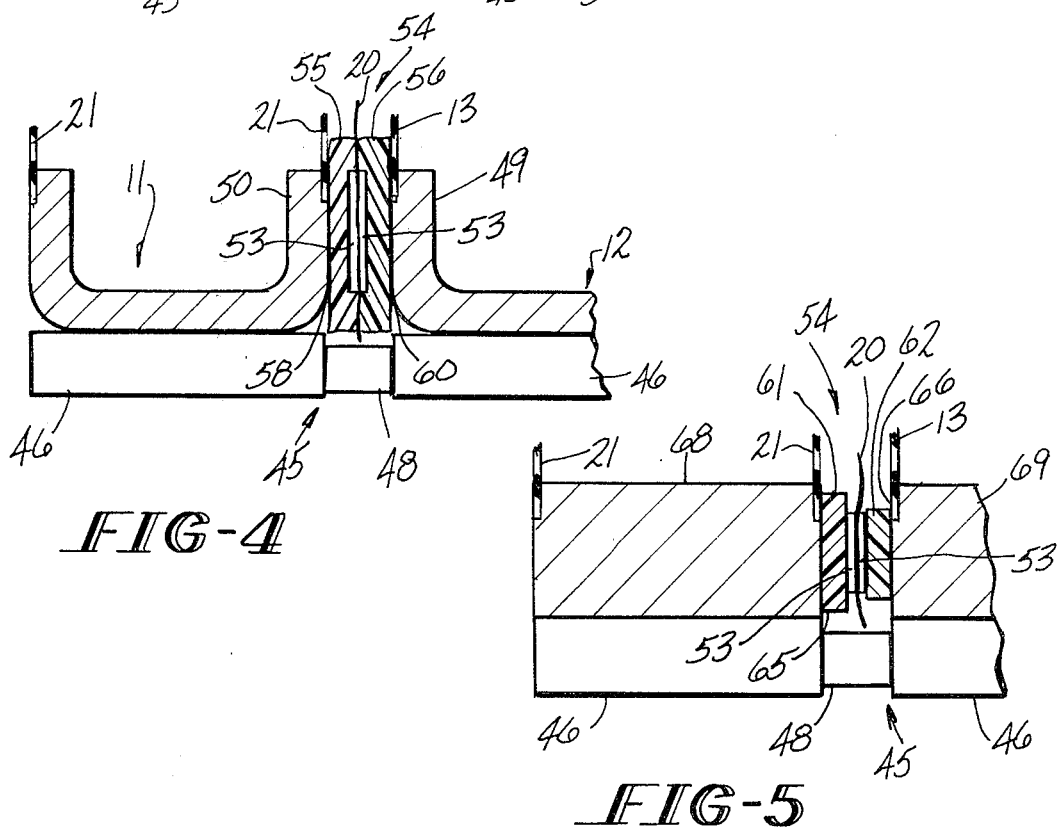

CELLS HAVING GASKET LUBRICATING MEANS

BACKGROUND OF THE INVENTION

This application is a continuation-in-part of application Ser. No. 204,127, field Nov. 5, 1980.

The present invention relates to sealing means suitable for use in a filter press-type electrolytic cell. More particularly, the invention relates to lubricous means utilized between the sealing means and at least one opposing surface of a separator means, such as an ion-selective membrane, to permit the sealing means to deform without damaging the separator means in an electrolytic cell.

Commercial cells for the production of chlorine and alkali metal hydroxides have been continually developed and improved over a period of time dating back to at least 1892. In general, chlor-alkali cells are of the deposited asbestos diaphragm type or the flowing mercury cathode type. During the past few years, developments have been made in cells employing separtors having ion exchange properties which promise advantages over either diaphragm or mercury cells. It is desirable to take advantage of existing technology, particularly in diaphragm cells, but it is also necessary to provide cell designs which meet the requirements of these newer separator materials. Since suitable separator materials, such as those marketed by E. I. Du Pont de Nemours and Company under the trademark Nafion ® and by Asahi Glass Company Ltd. under the trademark Flemion ®, are available primarily in sheet form, the most generally used cell employing such separators or membranes are of the "filter press" type. Filter press cells may employ electrode structures which are monopolar or bipolar.

In the filter press cell, separators in sheet form are clamped between the sides of the frame members. The sealing means employed, normally elastomeric gaskets, must effectively provide a fluid-tight seal between the frame members and the separator without damaging the separator. Part of the difficulty during assembly and the obtaining of a fluid-tight seal has been found to reside in the fact that the gaskets utilized to separate the electrode frames deform and expand outwardly as pressure is applied to the frames via the frame members. As the gaskets deform outwardly, certain separators which are in contact with the gaskets tend to stretch when they are pulled under the pressure of the outwardly deforming gaskets.

It has been found in the assembly of filter press membrane cells that this stretching of the separator or membrane beneath the gaskets employed on adjacent electrode frames can cause the membranes to break or tear when attempting to compress the frames into a fluid-tight cell. This compression typically is applied manually or may be applied utilizing hydraulic rams or other types of pressure-applying apparatus to compress the electrode frames and the separating gaskets together.

Any tears or breaks in the membranes may reduce current efficiency during operation, greatly increasing electrical current usage while reducing the electrolytic operating efficiency of the cell. Too great a drop in current efficiency and/or electrolytic operating efficiency can require costly shutdown of the entire cell while the damaged membrane or membranes are replaced.

Sealing means, including gaskets and other appropriate apparatus, for cells employing ion exchange membranes as separators include those described in U.S. Pat. No. 4,026,782, issued May 31, 1977, to P. Bouy et al, U.S. Pat. No. 4,175,025, issued Nov. 20, 1979, to E. D. Creamer et al, and U.S. Pat. No. 4,207,165, issued June 10, 1980, to Mose et al. U.S. Pat. No. 4,026,782 teaches bipolar cells having frames with recesses into which the sealing members fit. In one of the recesses, a diaphragm is sealed into the frame with a putty or caulked gasket. This sealing arrangement requires a complex frame structure which utilizes spacer apparatus that is a part of one of the electrode frames. This arrangement suffers from the disadvantage of not being able to vary the gap between the electrode frames with simply the replacement of the sealing means should it be necessary to have a different gap between the electrode frames.

U.S. Pat. No. 4,175,025 describes filter press frames having at least one formed recess into which a gasket is fit. The membrane is sized to extend beyond the edges of the frame so that shrinkage of the membrane during regeneration will not prevent its re-use. Adjacent frames may contain recesses which are opposite each other, but of different sizes. Gaskets having different hardnesses are used to seal the membrane between them. The gap between the electrode frames in this type of sealing arrangement is entirely dependent upon the gasket height and the amount of compression applied to the frames. Thus, the gap can vary between each pair of adjacent frames as the thickness of the gaskets employed varies or the recesses machined into the frames vary.

To provide recesses in the frame members of the type disclosed in U.S. Pat. Nos. 4,026,782 and 4,175,025, operations such as machining must be employed. These operations add undesired increases to the cost of producing the frames.

The arrangement disclosed in U.S. Pat. No. 4,207,165 employs a fixed spacer member between the adjacent electrodes to establish a desired gap.

However, all of these methods of securing the membrane between the gasket members or spacer members can promote tearing of the membrane or separator during assembly or operation of the cell.

The aforementioned problems are solved in the design of the apparatus comprising the present invention by providing in a filter press membrane electrolytic cell lubricous means between at least one gasket or sealing means and the adjacent surface of the membrane or separator between adjacent electrode frames to permit the gasket or sealing means to deform during the assembly and operation of the cell when compressive force is applied to effect fluid-tight seals between the gaskets or sealing means and the adjacent electrode frames without damaging the membrane or separator.

SUMMARY OF THE INVENTION

It is an object of the present invention to provide sealing means in filter press cells using frames which are simple and in which direct contact between the separator and the frames is avoided.

Another object of the present invention is to provide sealing means which prevent undesired slippage between the sealing means and the slippery surfaces of the separator which is wet with electrolytes such as caustic solutions.

A further object of the present invention is to provide sealing means which contribute to the control of the compression pressures employed.

It is a further object of the present invention to provide lubricous means that can be placed between the sealing means and opposing surfaces of the membrane of each pair of adjacent electrode frames to permit the sealing means to deform without tearing or breaking the membrane or separator during the assembly and operation of the cell.

It is yet another object of the present invention to provide a relatively simple and low cost way of ensuring that a fluid-tight seal can be obtained between the adjacent electrode frames without damaging the membrane or separator that is positioned between each pair of adjacent electrode frames.

It is a feature of the present invention that lubricous means are installed about the entire periphery of at least one of the sealing means between the separator or membrane of each pair of adjacent electrode frames to prevent tearing or breaking of the separator or membrane during assembly and operation.

It is another feature of the present invention that the lubricous means can comprise a thin strip of fluorocarbon material, such as Teflon ®.

It is an advantage of the present invention that the lubricous means are a relatively low cost and an effective way of preventing separator or membrane damage during cell assembly and operation.

It is another advantage of the instant invention that the libricous means and sealing means are easily installed during assembly of the cell.

It is yet another advantage of the present invention that the lubricous means and sealing means cooperate to preserve the integrity of the separator or membrane while compressive forces are applied to the adjacent electrode frames during cell assembly and operation.

These and other objects, features, and advantages are obtained in an electrolytic cell having a plurality of adjacently positioned electrodes held together by clamping means by providing lubricous means insertable between at least first sealing means and a first surface of the separator or membrane of each pair of adjacent electrode frames so that when the clamping means press the frames together, at least the first sealing means can deform outwardly and slidably against one side of the lubricous means and while the opposing side of the lubricous means and the first surface of the separator remain substantially fixed in place to prevent slipping or tearing of the separator.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 3 illustrates a front elevation in perspective view of a pair of adjacent electrode frames employing the novel lubricous means of the present invention with the inter-electrode sealing means;

FIG. 4 is an enlarged partial sectional view of the electrode frames of FIG. 3 taken along the line 4—4 showing the lubricous material employed in the present invention with one type of sealing means usable to obtain a fluid-tight seal that does not damage the separator or membrane;

FIG. 5 shows a partial sectional view of the libricous material employed in the present invention with bar-shaped frames and another type of sealing means usable to obtain a fluid-tight seal that does not damage the separator or membrane.

DETAILED DESCRIPTION OF THE PREFERRED EMBODIMENT

Figures 1, 2:
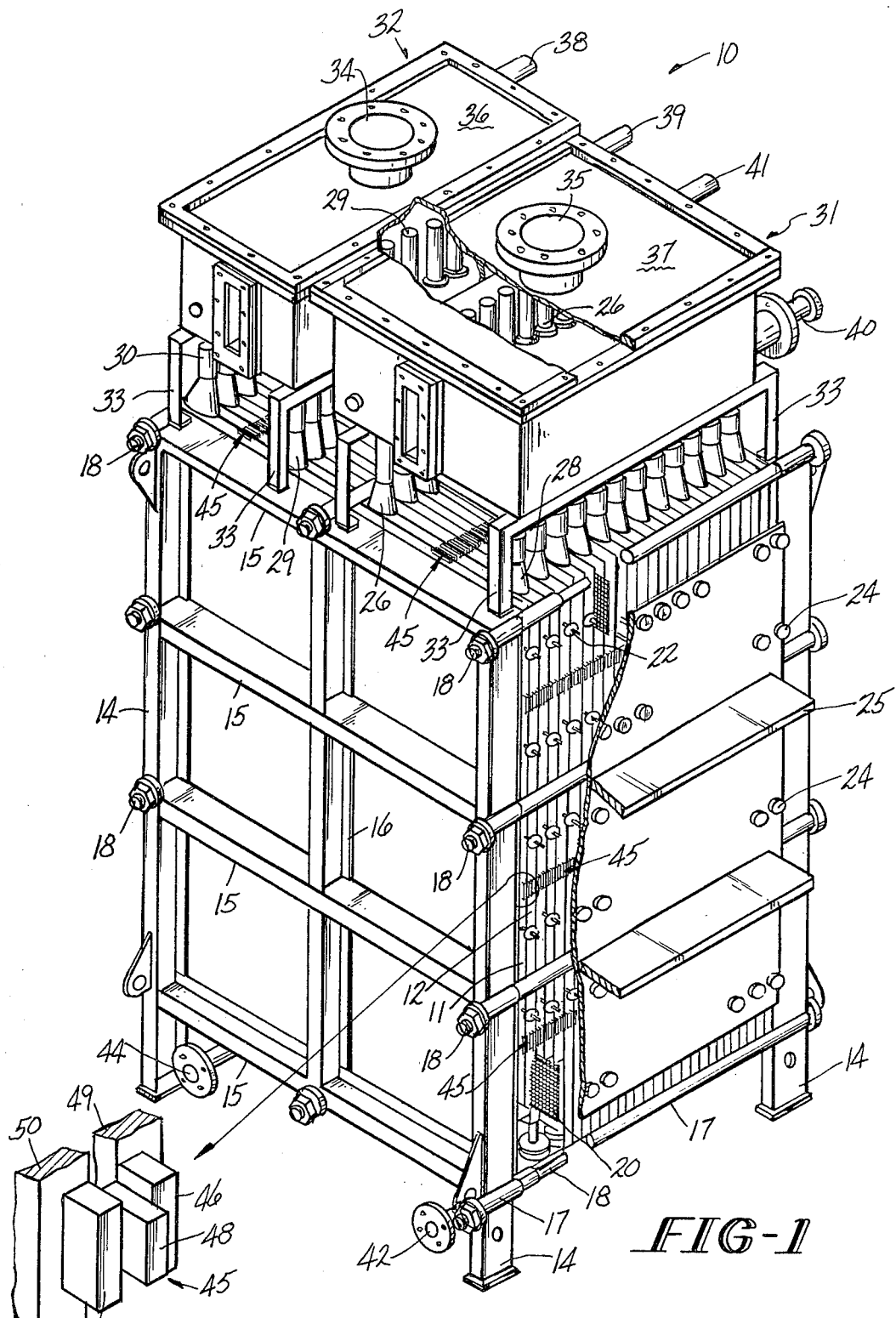
FIG. 1 is a side perspective view of a monopolar filter press membrane electrolytic cell with appropriate portions broken away to illustrate the anodes, cathodes, anolyte disengager, the catholyte disengager, and the positioning of the spacer means between each pair of electrode frames.
FIG. 2 is an enlarged diagramatic illustration of the spacer means positioned in a partially inserted manner between two adjacent electrode frames, but not showing the sealing means.

Referring to FIG. 1, a filter press membrane cell, indicated generally by the numeral 10, is shown in a side perspective view. It can be seen that cathode frames 11 and anode frames 12 alternate and are oriented generally vertically. The cathode frames 11 and anode frames 12 are supported by vertical side frame members 14, horizontal side frame members 15, and intermediate vertical side frame members 16 (only one of which is shown). The cathode frames 11 and anode frames 12 are pressed together and secured by a series of tie bolts 18 which are inserted through appropriate mounting means affixed to the vertical side frame members 14 and horizontal side members 15. To prevent short circuiting between the electrodes during the electrolytic process, the tie bolts 18 have tie bolt insulators 17 through which the tie bolts 18 are passed in the area of the cathodes 11 and anodes 12.

Electrical current is passed, for example, from an external power source through the anode bus and then via anode bus nuts, both not shown, into the anode conductor rods 19 of FIG. 3. From that point, the conductor rods 19 carry the current into the opposing anode faces 13, see briefly FIGS. 4 and 5. The current continues flowing through the membrane 20, through the opposing cathode faces 21, see briefly FIGS. 4 and 5, the cathode conductor rods 22 and the cathode bus nuts 24 to the cathode bus 25 where it continues its path out of the cell. Ion-selective permeable membranes 20 are diagramatically shown in FIG. 1 to illustrate how each anode frame 12 and cathode frame 11 are separated by the membrane.

Projecting from the top of anode frame 12 and cathode frame 11 are a series of fluid flow conduits. FIGS. 1 and 3 show anode risers 26 and anode downcomers or anolyte return lines 28 projecting from the top of each anode frame 12. Similarly, cathode risers 29 and cathode downcomers or catholyte return lines 30 are shown projecting from the top of each cathode frame 11. The risers are generally utilized to carry the appropriate electrolyte fluid with the accompanying gas, either anolyte with chlorine gas or catholyte with hydrogen gas, to the appropriate disengager mounted atop the filter press membrane cell 10. The anolyte disengager is indicated generally in FIG. 1 by the numeral 31, while the catholyte disengager is indicated generally by the numeral 32. Each disengager is supported atop of the cell 10 by disengager supports 33. It is in each of these disengagers that the entrained gas is enabled to separate from the liquid of the anolyte or catholyte fluid, as appropriate, and is released from the appropriate disengager via either a cathode gas release pipe 34 or an anode gas release pipe 35 affixed to the appropriate catholyte disengager cover 36 or anolyte disengager cover 37.

Also partially illustrated in FIG. 1 is the catholyte replenisher conduit 38 which carries deionized water into the catholyte disengager 32. The deionized water is appropriately fed through the catholyte disengager 32 to each cathode 11 in cell 10. A catholyte outlet pipe 39 is also partially illustrated and serves to control the level of liquid fluid in the catholyte disengager 32 by removing caustic to its appropriate processing apparatus.

An anolyte replenisher conduit 40 carries fresh brine into the anolyte disengager 31 and is best seen in FIG. 1. The fresh brine is then appropriately fed into each anode frame 12 with the existing anolyte fluid which is recirculated from the anolyte disengager 31 into each anode frame 12 via the downcomers 28. An anolyte outlet pipe 41 is also shown and serves to control the level of liquid in the anolyte fluid within the anolyte disengager 31 by removing the spent brine from the disengager 31 for regeneration.

Also shown in FIG. 1 are a cathodic bottom manifold 42 and an anodic bottom manifold 44, which are utilized to drain the appropriate electrodes.

The filter press membrane cell 10 has been described only generally since the structure and the function of its central components are well known to one of skill in the art. A more detailed and thorough description of the filter press membrane cell 10 is found in U.S. Pat. application Ser. No. 128,684, filed Mar. 10, 1980, and assigned to the assignee of the present invention. This application is hereinafter specifically incorporated by reference in pertinent part insofar as it is consistent with the instant disclosure.

Still referring to FIG. 1, spacer means, indicated generally by the numeral 45, are shown appropriately fastened to the exterior of the cathode frames 11 and anode frames 12. The spacer means 45 are positioned about the cell 10 so that there are generally three along the longitudinal or bottom to top side members or each cathode frame 11 and anode frame 12, while two are generally spaced along the top and bottom portions of the electrodes. The enlarged diagramatic illustration in FIG. 2 shows the spacer means 45 comprising outrigger blocks 46 which are appropriately fixedly fastened to the side members of the adjacent cathode frames 11 and anode frames 12. Outrigger blocks 46 are normally welded to the electrode frames. A spacer block 48, as shown in FIG. 2, is partially removed and is positioned between the outrigger blocks 46. Beacuse FIG. 2 is a diagramatic illustration, it does not show the membrane or separator 20, nor the sealing means or gaskets, which are positioned between the adjacent cathode frames 11 and anode frames 12 and are best seen in FIGS. 3 through 5. FIGS. 4 and 5 show how the spacer blocks 48 are positioned and retained by the outrigger blocks 46 along planes that pass through the adjacent opposing sides of the adjacent electrode frames.

FIG. 3 shows that the cathode frames 11 and anode frames 12 comprise anode vertical members 49, only one of which is shown, and cathode vertical members 50. Interconnecting the cathode vertical frame members 50 are the generally horizontal cathode frame members 51. Similarly, interconnecting the anode vertical frame members 49 are anode generally horizontal frame members 52, only one of which is shown. When assembled the appropriate cathode and anode frame members comprise cathode and anode frames 11 and 12 respectively, which have generally planar opposing first and second sides.

FIG. 4 shows the cooperation between the cathode frames 11, anode frames 12, spacer means 45, the sealing means or gaskets, indicated generally by the numeral 54, lubricous means 53, and the opposing surfaces of the separator or membrane 20. As seen in FIG. 4, separator or membrane 20 is positioned between gaskets 55 and 56, which are placed between the adjacent legs of the cathode vertical frame member 50 and the anode vertical frame member 49. Although not shown in their entireties in FIG. 4, the first and second generally planar cathode electrode faces 21 are shown fastened to one of the two cathode vertical frame members 50. The cathode vertical frame members 50 combine with the horizontal frame members 52 to form the generally planar opposing first and second sides. The anode frame 12 also has generally planar electrode faces 13 fastened thereto. As seen in FIG. 4, a third generally planar electrode face 13 is fastened to the anode vertical frame member 49 on the first generally planar side of the anode frame 12 formed by the anode vertical frame members 49 and the anode generally horizontal frame members 52. Gasket 55 has a first contactable surface which contacts the second side 58 of the cathode frame 11 at frame member 50 and a second contactable surface which contacts the first surface of the separator or membrane 20. Gasket 56 contacts along its first contactable surface the first side 60 of the adjacent anode frame 12 at the vertical frame member 49 and along its second contactable surface the opposing second surface of separator or membrane 20.

Positioned between gasket 55 and separator 20 is lubricous means 53, preferably comprised of a strip of fluorocarbon material, such as polyfluorotetraethylene, commonly known as Teflon ®. Similarly, interposed between the opposing surface of the separator 20 and gasket 56 is another strip of the lubricous means 53. Lubricous means 53 have a first side that is adjacent the sealing means or gasket and an opposing second side that is adjacent the appropriate surface of the separator or membrane 20. Both strips provide lubricated type surfaces between the separator 20 and the gaskets 55 and 56 to permit the gaskets 55 and 56 to slip therealong as they deform outwardly when they are subjected to the compressive forces used during cell assembly. By permitting the gaskets 55 and 56 to slip along the surfaces of the lubricous means 53 during deformation, breaking or tearing of the separator is avoided.

Welded to the cathode vertical frame member 50 and the partially illustrated anode vertical frame member 49 are outrigger blocks 46. Outrigger blocks 46 are shown generally as being rectangular with the same thickness as the frame of the appropriate electrode. Positioned between the outrigger blocks 46 is a spacer block 48. Spacer block 48 is selected with a predetermined thickness to ensure a uniform gap between the adjacent electrode frames. Spacer block 48 must be of a good insulating quality and essentially non-compressible. Spacer block 48 may be of any substance possessing these characteristics; however, micarta has been the preferred substance. Impregnated wood or un-impregnated suitable hardwood can also be employed as spacers. It is even possible that plexi-glass of sufficient strength could be employed.

In the embodiment shown in FIG. 5, the sealing means employed utilizes gaskets 61 and 62 against the sides 65 and 66 of the bar-type frame of cathode vertical frame member 68 and anode vertical frame member 69, respectively. Gasket 61 is designed to have a larger contactable surface area adjacent the separator or membrane 20 than gasket 62. Inserted between separator 20 and each gasket 61 and 62 are thin strips of lubricous means 53. Separator or membrane 20 is sealed during compression between the lubricous means 53 and the gaskets 61 and 62. Fixedly fastened to cathode vertical frame member 68 and the adjacent anode vertical frame member 69 are outrigger blocks 46. Positioned between outrigger blocks 46 is the spacer block 48, again selected to a suitable predetermined thickness to maintain a uniform gap between the adjacent electrode frames after the cell 10 is compressed.

The lubricous means 53 have been described as thin strips of preferably fluorocarbon material. The strips have generally been about 10 mils thick and about 1 inch wide. The strips of lubricous means 53 extend about the entire periphery of each electrode frame between the sealing means 54 and the separator or membrane 20 in the manner illustrated in FIGS. 4 and 5. Alternately, a single strip of lubricous means could be employed where the strength and surface properties of the separator 20 permit. For example, where the separator 20 has one rough surface, only a single lubricous strip may be required. It should also be noted that under certain conditions the lubricous means 53 could use a substance made of polypropylene, the determining being the lubricity of the material employed and the resistance of the material to the elecrolyte fluid with which the material is in contact.

Suitable as sealing means 54 are gaskets comprised of elastomer such as Neoprene, Hypalon, ethylenepropylene dimonomer (EPDM) or gum rubber. The hardness of the sealing means is not critical and any suitable hardness may be selected independently for either gasket. Preferably, gaskets have a low degree of hardness which allows the gaskets to fill in irregularities on the frame members and thus permit reduced tolerances which minimizes, for example, machining of metal frames and reduces production costs. During assembly, tie bolts 18 are individually tightened around the perimeter of the cell 10. This tightening of the tie bolts 18 holds the individual electrode frames together. Between any two adjacent electrode frames, the cathode frame 11 and the anode frame 12 are pressed together so that the sealing means 54 is compressed. Since each cathode frame 11 and anode frame 12 have individual gaskets which extend about the entire periphery of the electrode frames, the electrodes are separated by the individual gaskets or sealing means 54 and the membrane or separator 20 which is inserted therebetween. The lubricous means 53 are inserted between the gaskets or sealing means 54 and either one or both surfaces of the membrane or separator 20, as desired. The opposing faces of the electrodes are separated by a uniform gap that is established by the thickness of the spacer block 48. Since the electrodes are compressed together by the application of a suitable closure force, the gaskets deform in a manner which effects a fluid-tight seal between the adjacent electrode frames, as well as securing the membrane 20 along both surfaces to avoid any undesired slippage. The amount of compression between the adjacent cathode frames 11 and anode frame 12 is determined by the thickness of the spacer block 48 which is pressed between the adjacent outrigger blocks 46 fixedly fastened to each electrode frame. Once the desired compression has been achieved, the tie bolts 18 are secured in a manner to retain this compression and the fluid-tight seal effected by the improved sealing means 54. The strips of lubricous means 53 permit the sealing means 54 or gaskets to deform without tearing the membrane or separator 20 and without permitting any undesired slipping of the membrane or separator 20. A uniform inter-selected gap is obtained because the spacer blocks 48 are distributed about the periphery of the electrode frames. Once a fluid-tight seal has been effected between any two adjacent cathode frames 11 and anode frames 12 so that the spacer blocks 48 are subject to compressive forces conducted through the adjacent outrigger blocks 46, any additional compressive force will be borne by the spacer blocks positioned between the adjacent cathode frame 11 and anode frame 12.

The width of the raised portion of the second gasket is selected to provide less area of contact with the separator than that of the first gasket. Further, the width of the raised portion is selected to provide the desired control of the gasket compression pressures and the gasket frame surface structural forces. Control of these pressures minimize compression set for gasket materials and bending or twisting of frame members. The embodiment of the novel sealing means shown in FIG. 5 is particularly suitable where the electrolytic cell employs higher compression pressures.

The width of the raised portion of the gasket is especially selected to provide the desired control of the gasket compression and of the frame surface structural forces. The width of the raised portion is kept narrow enough not to exceed the structural strength of the frame member. The force on the frame member per lineal inch of frame member is $F_i = P \times W$ where $P$ is the gasket pressure of the raised portion and $W$ is the expanded width of the raised portion in compression.

The expanded width $W = w \div (1-c)$ where $w$ is the initial width of the raised portion and $c$ is the fractional compression expressed as a decimal. The compression factor $c$ is selected high enough to assure sealing, depending upon the gasket material and may be from 0.05 to 0.55 and preferably from 0.2 to 0.4.

Hydraulically permeable or impermeable separators may be employed in the electrolytic cell of the present invention. Preferably, inert flexible separators having ion exchange properties and which are impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. The equivalent weight of the perfluorosulfonic acid resin is from about 900 to about 1600 and preferably from about 1100 to about 1500. The perfluorosulfonic acid resin may be supported by a polyfluoroolefin fabric. The composite membrane sold commercially by E. I. Du Pont de Nemours and Company under the aforementiond trademark "Nafion ®" is a suitable example of this membrane.

A second example of a suitable membrane is a cation exchange membrane using a carboxylic acid group as the ion exchange group. These membranes have, for example, an ion exchange capacity of 0.5–4.0 mEq/g of dry resin. Such a membrane can be produced by copolymerizing a fluorinated olefin with a fluorovinyl carboxylic acid compound as described, for example, in U.S. Pat. No. 4,138,373, issued Feb. 6, 1979, to H. Ukihashi et al. A second method of producing the above-described cation exchange membrane having a carboxyl group as its ion exchange group is that described in Japanese Patent Publication No. 1976–126398 by Asahi Glass Kabushiki Gaisha issued Nov. 4, 1976. This method includes direct copolymerization of fluorinated olefin monomers and monomers containing a carboxyl group or other polymerizable group which can be converted to carboxyl groups. Carboxylic acid type cation exchange membranes are available commercially from the Asahi Glass Company under the trademark "Flemion ®".

Frame members may be in the shape of rectangular bars, C or U channels, cylindrical tubes, elliptical tubes as well as being I-shaped or H-shaped. Preferably, the frame members are in the shape of a C channel as shown in FIG. 4.

The materials of construction for frame members may be any which are resistant to corrosion by the electrolytes and the products of electrolysis. For example, metals such as iron, steel, stainless steel, nickel, titanium, or alloys of these metals may be used. Similarly, plastic materials such as polypropylene, polybutylene, polytetrafluoroethylene, FEP, and chlorendic acid based polyesters can be employed. However, the electrode frame members must be of a suitable material to permit the outrigger blocks 46 to be fixedly fastened thereto. For example, if the anode vertical and generally horizontal frame members 49 and 52 are made of titanium, outrigger blocks 46 made of titanium are then also used. If the cathode vertical and generally horizontal frame members 50 and 51 are made of nickel, the outrigger blocks 46 may be made of nickel or steel. It should also be noted that it is generally desired to have the outrigger blocks attached to the appropriate electrode frame near the tie bolts 18.

Electrolytic cells of the present invention provide many inherent advantages, for example, gasket compression pressures are controlled as well as gasket frame surface structural forces. Efficient fluid-tight seals are obtained while preventing gaskets slipping or tearing or other damage to the membranes. Additional advantages provide improved cell assembly tolerances and reduce costs. A further advantage lies in the lower compression pressure which may be employed permitting the use of smaller compression apparatus.

While the preferred structure in which the principles of the present invention have been incorporated as shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts which will occur to one of skill in the art upon a reading of the disclosure.

Having thus described the invention, what is claimed is:

1. In an electrolytic cell having a plurality of adjacently positioned electrodes in which electrolyte fluid is contained comprising at least:

(a) a first frame member having a first generally planar side and an opposing second generally planar side to which are respectively connected a first generally planar electrode face and a second generally planar electrode face, at least the opposing second side defining a first plane;

(b) a second frame member having a first generally planar side and an opposing second generally planar side to which are respectively connected a third generally planar electrode face and a fourth generally planar electrode face, at least the first side defining a second plane adjacent the first plane and being generally parallel thereto;

(c) separator means for separating the first frame member from the second frame member having a first surface adjacent the second electrode face and an opposing second surface adjacent the third electrode face;

(d) first sealing means contacting the second side of the first frame member and adjacent the first surface of the separator means, the first sealing means having a first contactable surface of a first predetermined surface area adjacent the separator means;

(e) second sealing means contacting the first side of the second frame member and adjacent the second surface of the separator means having a first contactable surface with a first predetermined surface area adjacent the first side of the second frame member and a second contactable surface with a second predetermined surface area adjacent the separator means;

(f) clamping means for pressing the frames together against the sealing means and the separator means to form a substantially fluid-tight seal between the frame members and the first sealing means and the second sealing means; the improvement comprising (g) lubricous means having a first side and an opposing second side insertable between at least the first sealing means and the first surface of the separator means so that when the clamping means press the frame members together at least the first sealing means can deform outwardly and slidably against the first side of the lubricous means while the opposing second side and the first surface of the separator means remain substantially fixed in place preventing undesired slipping or tearing of the separator means.

2. The apparatus according to claim 1 wherein the first frame member and the second frame member have spacer means of predetermined thickness positioned between the first plane and the second plane to thereby define a uniform gap equal to the predetermined thickness of the spacer means.

3. The apparatus according to claim 1 wherein the lubricous means further comprises a strip of fluorocarbon material.

4. The apparatus of claim 3 wherein said first and second sealing means are of equal width.

5. The apparatus of claim 3 wherein said first and second sealing means are of unequal width.

6. The apparatus according to claim 2 wherein the strip further is comprised of polyfluorotetraethylene.

7. The apparatus according to claim 1 wherein a second lubricous means having a first side and an opposing second side is insertable between the second sealing means and the second surface of the separator means so that when the clamping means press the frame members together the second sealing means can deform outwardly and slidably against the first side of the lubricous means while the opposing second side of the second lubricous means and the second surface of the separator means remain substantially fixed in place.

8. The apparatus according to claims 4, 5 or 7 wherein the first sealing means and the second sealing means are gaskets.

9. The apparatus according to claim 8 wherein the separator means is hydraulically permeable.

10. The apparatus according to claim 8 wherein the separator means is hydraulically impermeable permselective membrane.

11. In an electrolytic cell having a plurality of adjacently positioned electrodes in which is contained electrolyte fluid, at least a first frame member and an adjacent second frame member, each frame member having opposing sides with electrode faces, an ion-selective membrane having a first surface and an opposing second surface positioned between the first frame member and the second frame member, sealing means interposed between each frame member and the membrane, and clamping means to press the frames together, the improvement comprising:

lubricous means having a first side and an opposing second side insertable between at least the sealing means and the first surface of the membrane so that when the clamping means press the frame members together, the sealing means can deform outwardly and slidably against at least the first side of the lubricous means while the opposing second side and the first surface of the membrane remains substantially fixed in place preventing undesired slipping or tearing of the membrane.

12. The apparatus according to claim 11 wherein a second lubricous means is provided having a first side and an opposing second side insertable between the sealing means and the second surface of the membrane so that when the clamping means press the frame members together the sealing means can deform outwardly and slidably against the first side of the second lubricous means while the opposing second side of the second lubricous means and the second surface of the membrane remains substantially fixed in place.

13. The apparatus according to claims 11 or 12 wherein the first frame member and the opposing side adjacent the first surface of the membrane define a first plane and the second frame member and the opposing side adjacent the second surface of the membrane define a second generally parallel plane.

14. The apparatus according to claim 13 wherein the first frame member and the second frame member have spacer means of predetermined thickness positioned between the first plane and the second plane to thereby define a uniform gap equal to the predetermined thickness of the spacer means.

15. The apparatus according to claims 11 or 12 wherein the lubricous means further comprise a strip of fluorocarbon material.

16. The apparatus according to claim 14 wherein the lubricous means further is comprised of a polyfluorotetraethylene.

17. The apparatus according to claim 13 wherein the sealing means further comprise gaskets.

* * * * *